United States Patent
Tokuhisa et al.

(10) Patent No.: US 8,112,182 B2
(45) Date of Patent: Feb. 7, 2012

(54) MASS FLOW RATE-CONTROLLING APPARATUS

(75) Inventors: Yasukazu Tokuhisa, Mie-ken (JP); Takao Gotoh, Mie-ken (JP); Tohru Matsuoka, Mie-ken (JP); Shigehiro Suzuki, Mie-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 983 days.

(21) Appl. No.: 10/572,046

(22) PCT Filed: Feb. 3, 2005

(86) PCT No.: PCT/JP2005/001622
§ 371 (c)(1),
(2), (4) Date: Jan. 9, 2007

(87) PCT Pub. No.: WO2005/076095
PCT Pub. Date: Aug. 18, 2005

(65) Prior Publication Data
US 2007/0198131 A1 Aug. 23, 2007

(30) Foreign Application Priority Data
Feb. 3, 2004 (JP) .................................. 2004-027306

(51) Int. Cl.
*G05D 11/00* (2006.01)
(52) U.S. Cl. ......................... 700/282; 700/121; 700/266
(58) Field of Classification Search .................. 700/282, 700/285, 121, 266
See application file for complete search history.

(56) References Cited

U.S. PATENT DOCUMENTS

| 6,287,980 B1 * | 9/2001 | Hanazaki et al. | 438/726 |
| 6,352,591 B1 * | 3/2002 | Yieh et al. | 118/697 |
| 6,779,569 B1 * | 8/2004 | Teer et al. | 141/94 |
| 2002/0092564 A1 * | 7/2002 | Ollivier | 137/487.5 |

FOREIGN PATENT DOCUMENTS

| JP | 03-014010 | 1/1991 |
| JP | 05-134764 | 6/1993 |
| JP | 7-49525 | 11/1995 |
| JP | 10-207554 | 8/1998 |
| JP | 10-268942 | 10/1998 |
| JP | 11-259140 | 9/1999 |
| JP | 2000-137527 | 5/2000 |
| JP | 2003-504888 | 4/2003 |
| WO | WO 01/04585 A1 | 1/2001 |

* cited by examiner

*Primary Examiner* — Kakali Chaki
*Assistant Examiner* — Nathan Laughlin
(74) *Attorney, Agent, or Firm* — Sughrue Mion, PLLC

(57) ABSTRACT

A mass flow rate-controlling apparatus including a mass flow rate-detecting mechanism 8 a flow rate-controlling valve mechanism 10 and a mechanism 44 for controlling the flow rate-controlling valve mechanism based on a flow rate-setting signal S0 input from outside and a flow rate signal S1, the flow path being provided with a pressure-detecting mechanism 42 for detecting the pressure of the fluid to output the detected pressure signal, so that the controlling mechanism selectively switches a first control mode for controlling the mass flow rate based on the flow rate signal and the flow rate-setting signal without using the detected pressure signal, and a second control mode for controlling the mass flow rate based on the detected pressure signal, the flow rate signal and the flow rate-setting signal, based on a pressure variation obtained from the detected pressure signal.

10 Claims, 11 Drawing Sheets

MASS FLOW RATE-CONTROLLING APPARATUS

FIELD OF THE INVENTION

The present invention relates to a mass flow rate-controlling apparatus for measuring and controlling a mass flow rate of a fluid such as a gas, etc. having a relatively small flow rate.

BACKGROUND OF THE INVENTION

To produce semiconductor products such as integrated semiconductor circuits, etc., it is generally necessary to repeatedly conduct CVD, etching, etc. to semiconductor wafers, etc. by semiconductor-producing apparatuses, while precisely controlling the amount (trace amount) of a treating gas supplied. For this purpose, for instance, mass flow rate-controlling apparatuses such as mass flow controllers are used (see JP1-227016A, JP4-366725A and JP4-366726A).

The structure of the general mass flow rate-controlling apparatus will be explained referring to FIGS. 11 and 12. FIG. 11 schematically shows one example of a conventional mass flow rate-controlling apparatus arranged on a gas pipe, and FIG. 12 shows a circuit of a flow rate-detecting means in the mass flow rate-controlling apparatus. The mass flow rate-controlling apparatus 2 is disposed in the course of a fluid path (for instance, gas pipe 4) for flowing a fluid such as a liquid, a gas, etc. The semiconductor-producing apparatus connected to one end of the gas pipe 4 is evacuated. The mass flow rate-controlling apparatus 2, comprises a flow path 6 made of, for instance, stainless steel, etc., and both ends of the flow path 6 are connected to the gas pipe 4. The mass flow rate-controlling apparatus 2 comprises a mass flow rate-detecting means 8 positioned on the upstream side of the flow path 6, and a flow rate-controlling valve mechanism 10 positioned on the downstream side of the flow path 6.

The mass flow rate-detecting means 8 comprises pluralities of bypass pipes 12 arranged on the upstream side of the flow path 6. Connected to both ends of the bypass pipes 12 is a sensor pipe 14 for flowing a smaller amount of a gas than in the bypass pipes 12 at a constant ratio. Namely, a predetermined percentage of a gas to the total flow rate always flows through the sensor pipe 14. A pair of series-connected controlling resistor lines R1, R4 are wound around the sensor pipe 14, so that a sensor circuit 16 connected to the resistor lines R1, R4 outputs a mass flow rate signal S1.

The mass flow rate signal S1 is supplied to a controlling means 18 constituted, for instance, by a microcomputer, etc., to determine the mass flow rate (present mass flow rate) of a presently flowing gas based on the mass flow rate signal S1, and control the flow rate-controlling valve mechanism 10 such that the present mass flow rate becomes equal to a mass flow rate of a flow rate-setting signal S0 input from outside. The flow rate-controlling valve mechanism 10 comprises a flow rate-controlling valve 20 disposed on the downstream side of the flow path 6, and the flow rate-controlling valve 20 comprises a diaphragm 22 constituted by a flexible metal plate, for instance, as a valve body for directly controlling the mass flow rate of a gas.

With the diaphragm 22 properly bent toward the valve opening 24, the valve-opening degree of the valve opening 24 can be arbitrarily controlled. To control the valve-opening degree, an upper surface of the diaphragm 22 is connected to a lower end of an actuator 26 constituted by a laminated piezoelectric element, for instance. The entire body of the actuator 26 is contained in a casing 27. The actuator 26 is operated by a valve-operating voltage S4 output from a valve-operating circuit 28 in response to an operating signal from a controlling means 18. The actuator 26 may be an electromagnetic actuator in place of the laminated piezoelectric element.

FIG. 12 shows the relation between the resistor lines R1, R4 and the sensor circuit 16. The series-connected resistor lines R1, R4 are connected to series-connected reference resistors R2, R3 in parallel to form a so-called bridge circuit. A constant current source 30 for supplying a constant current is connected to this bridge circuit. A connection of the resistor lines R1 and R4 and a connection of the reference resistors R2 and R3 are connected to the inputs of a differential circuit 32, which outputs a flow rate signal S1 representing potential difference between both connections.

The resistor lines R1, R4 made of a material whose resistance is variable depending on the temperature are wound around the sensor pipe 14 on upstream and downstream sides, respectively. The reference resistors R2, R3 are kept at a substantially constant temperature.

In the mass flow rate-controlling apparatus 2 thus constructed, when no gas is flowing through the sensor pipe 14, both resistor lines R1, R4 are at the same temperature, resulting in a balanced bridge circuit, so that the potential difference, the output of the differential circuit 32, is zero. When a gas flows through the sensor pipe 14 at a mass flow rate Q, the gas heated by the resistor line R1 on the upstream side flows to a downstream position, at which the resistor line R4 is wound, resulting in the conveyance of heat. As a result, temperature difference is generated between the resistor lines R1 and R4, resulting in resistance difference. The potential difference generated at this time is substantially proportional to the mass flow rate Q of the gas. Accordingly, it is possible to determine the mass flow rate of the gas flowing at this time by adding a predetermined gain to the flow rate signal S1. The valve-opening degree of the flow rate-controlling valve 20 is controlled such that the mass flow rate of the gas being detected becomes equal to that of the flow rate-setting signal S0.

In a general semiconductor-producing apparatus, the gas pipe 4 is sometimes used commonly for various gases. In that case, the gas pipe 4 is branched, with other gases converging in their courses. Flow rate variations by the start and stop of supplying other gases, etc. cause pressure variations, which may be transmitted through the gas pipe 4 to the mass flow rate-controlling apparatus 2, thereby adversely affecting the control of the mass flow rate. Pressure variations may occur by other causes, resulting in deteriorated controllability of the mass flow rate.

JP7-49525U, JP10-268942A and JP2000-137527A propose mass flow rate-controlling apparatuses, in which pressure variations generated on the downstream side are absorbed by ultrasonic nozzles disposed on a fluid outlet or downstream side. Also, JP2003-504888A, JP10-207554A and JP11-259140A propose pressure sensors for detecting the pressure of a gas flow to conduct various treatments based on the gas pressure.

When pressure variation occurs on the upstream side, to which a gas reservoir, etc. is connected, in the mass flow rate controller of JP7-49525U, however, the pressure variation may be directly conveyed to the mass flow rate sensor substantially free from pressure loss, adversely affecting the controllability of the mass flow rate. The mass flow rate-controlling apparatuses of JP10-268942A and JP2000-137527A can absorb pressure variation only in a region meeting the condition of an ultrasonic nozzle, in which pressure upstream of the nozzle is 2 times or more that on the downstream side, but they are even short of controlling the mass flow rate in a region failing to meet the condition of an ultrasonic nozzle.

As shown in FIG. 11, the mass flow rate-controlling apparatus 2 having the mass flow rate-detecting means 8 substantially free from pressure loss on the upstream side should be provided with a regulator for providing a gas flow free from pressure variation to the gas pipe 4 upstream of the mass flow rate-controlling apparatus 2, contributing to the facility cost increase. In addition, JP2003-504888A, JP10-207554A and JP11-259140A do not specifically teach treatment methods of the detected gas pressure, failing to sufficiently eliminate influence on the pressure variation.

OBJECTS OF THE INVENTION

Accordingly, an object of the present invention is to provide a mass flow rate-controlling apparatus capable of absorbing pressure variation, thereby exhibiting high controllability of a mass flow rate.

DISCLOSURE OF THE INVENTION

The mass flow rate-controlling apparatus of the present invention comprises a mass flow rate-detecting means attached to a fluid flow path, through which a fluid is supplied, for detecting a mass flow rate at a predetermined time interval, a flow rate-controlling valve mechanism attached to the fluid flow path for changing a valve-opening degree in response to a valve-operating signal to control the mass flow rate, a controlling means for supplying valve-operating voltage to the flow rate-controlling valve mechanism, and a pressure-detecting means attached to the fluid flow path for detecting the pressure of the fluid at a predetermined time interval; wherein the controlling means uses a first control mode for controlling the mass flow rate when the pressure variation is less than a predetermined threshold value; wherein in the first control mode, the controlling means stores the newest mass flow rate, the newest detected pressure and the newest valve-operating voltage; wherein in the first control mode, the controlling means compares a present mass flow rate signal obtained from the mass flow rate-detecting means with an externally input flow rate-setting signal to determine the valve-operating voltage; wherein the controlling means switches the first control mode to a second control mode when the pressure variation becomes equal to or more than the predetermined threshold value; and wherein in the second control mode, the controlling means determines the valve-operating voltage from the newest mass flow rate, the newest detected pressure and the newest valve-operating voltage stored in the first control mode, a presently detected pressure, and valve characteristics stored in advance.

The controlling means preferably outputs a mass flow rate immediately before the pressure variation reaches the threshold value as a flow rate output signal in the second control mode. The fluid path may be preferably provided with the pressure-detecting means, the mass flow rate-detecting means and the flow rate-controlling valve mechanism in this order from the upstream side. Alternatively, the fluid path may be preferably provided with the mass flow rate-detecting means, the pressure-detecting means and the flow rate-controlling valve mechanism in this order from the upstream side.

The flow rate-controlling valve mechanism preferably comprises an actuator comprising a piezoelectric element or an electromagnetic actuator. The fluid path comprises an orifice in the most upstream or downstream portion.

BEST MODE FOR CARRYING OUT THE INVENTION

Figure 1:
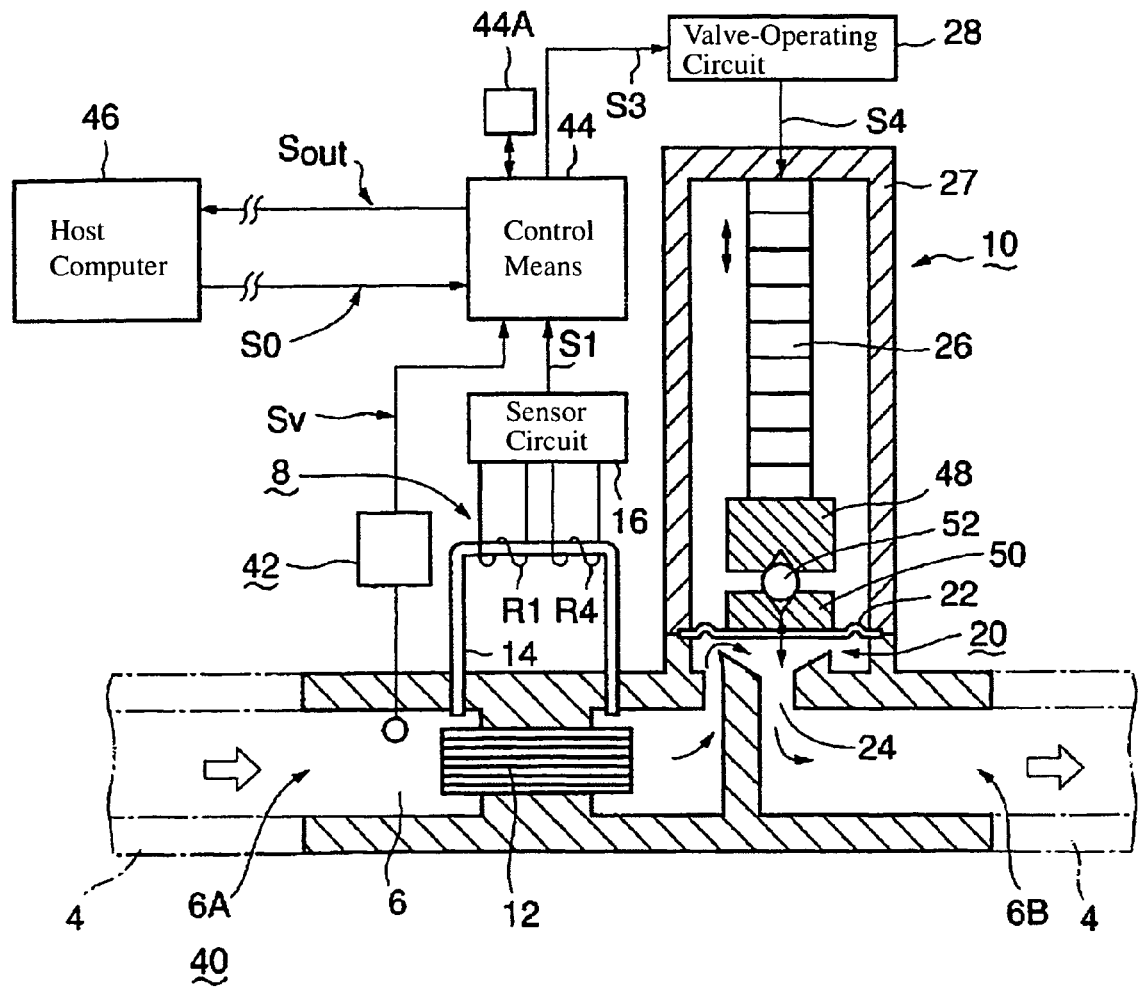
FIG. 1 is a schematic view showing one example of the mass flow rate-controlling apparatus of the present invention.
Figure 2A:
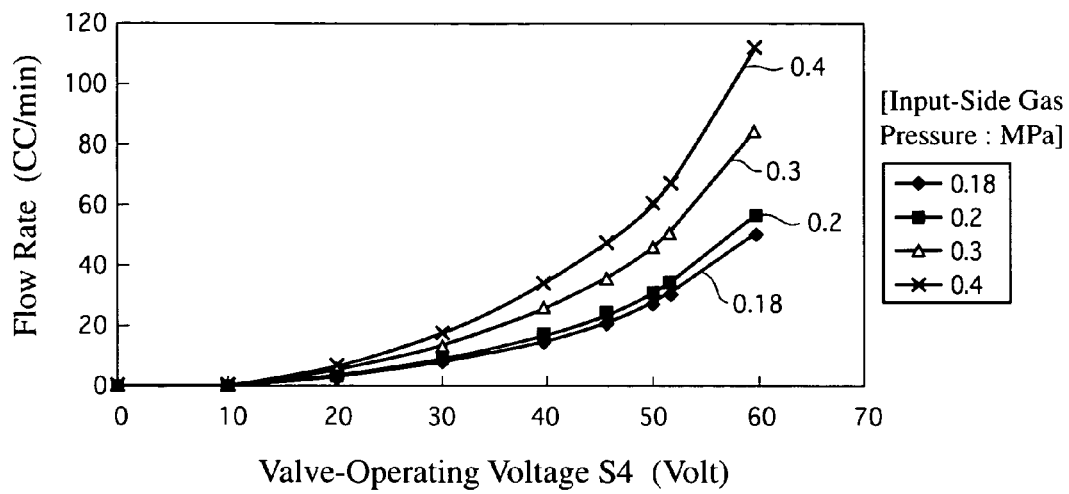
FIG. 2(a) is a graph showing one example of the valve characteristics of the flow rate-controlling valve mechanism when a laminated piezoelectric element is used as an actuator.
Figure 2B:
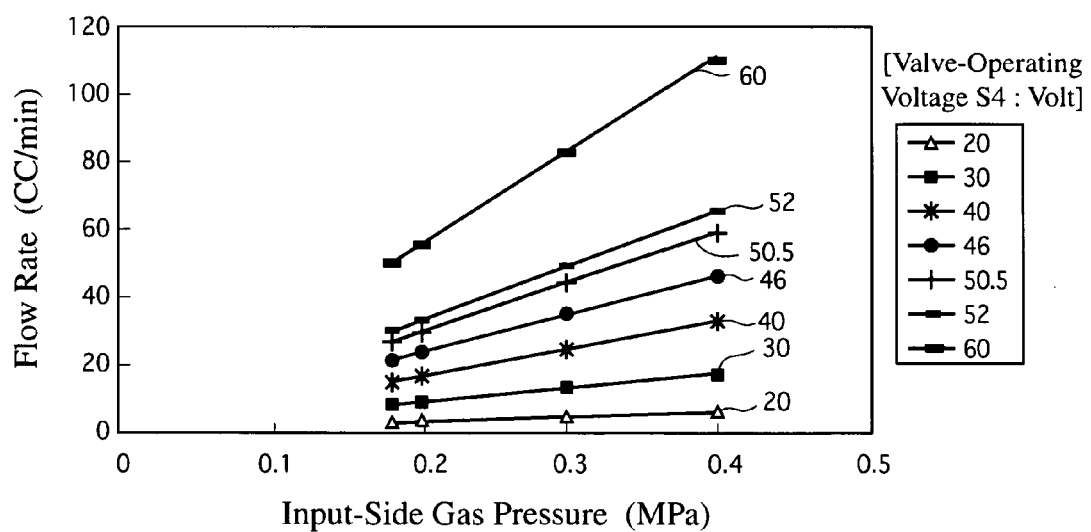
FIG. 2(b) is a graph showing one example of the valve characteristics of the flow rate-controlling valve mechanism when a laminated piezoelectric element is used as an actuator.
Figure 3:
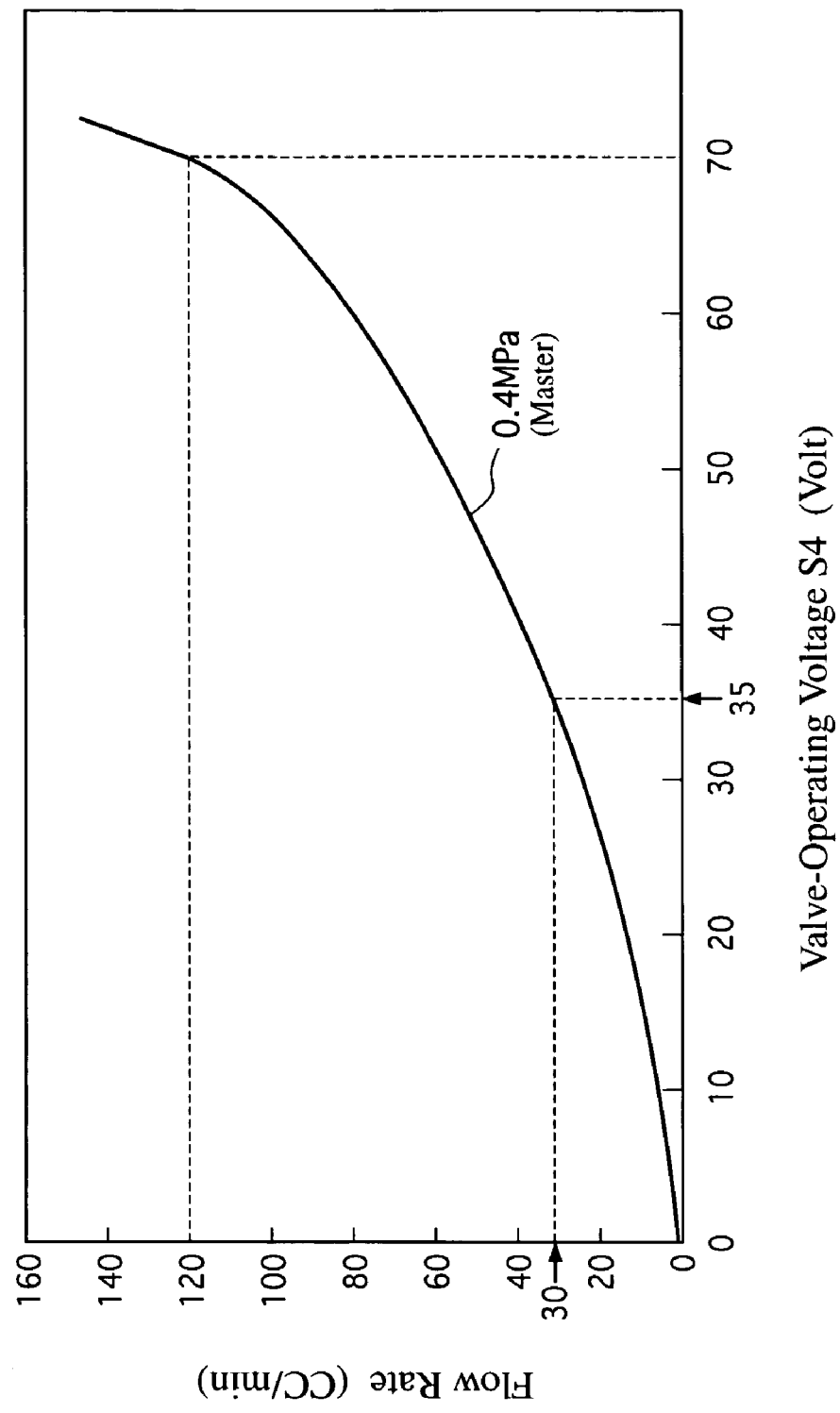
FIG. 3 is a graph showing part of the valve characteristics.
Figure 11:
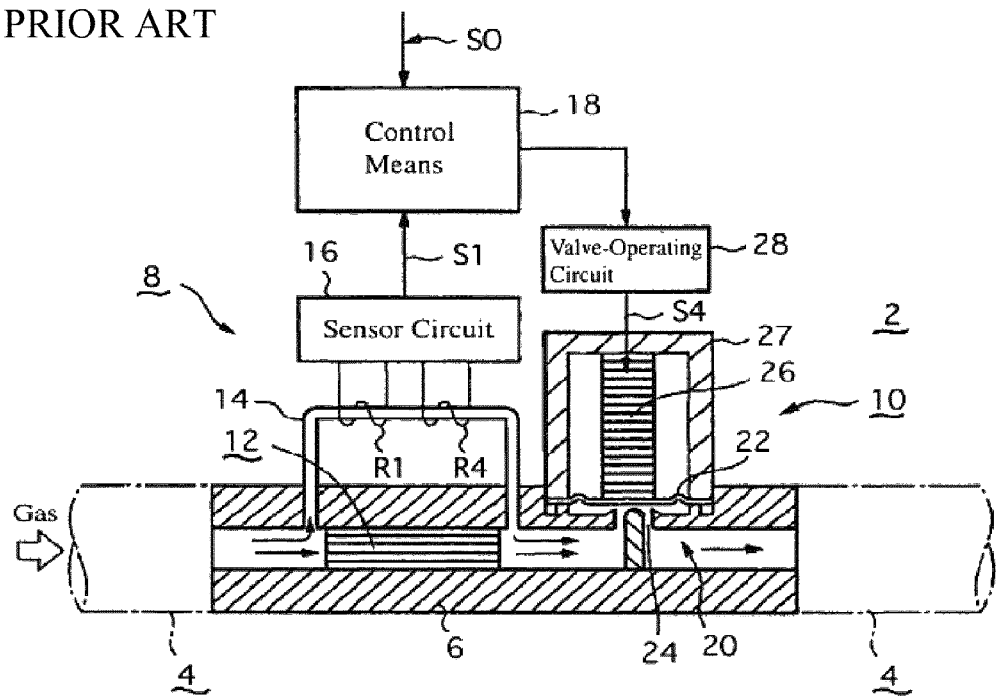
FIG. 11 is a schematic view showing one example of conventional mass flow rate-controlling apparatuses mounted to a gas pipe.

One example of the mass flow rate-controlling apparatus of the present invention will be explained in detail referring to the attached drawings, taking for example a case where a laminated piezoelectric element is used as an actuator. FIG. 1 shows one example of the mass flow rate-controlling apparatus of the present invention, FIG. 2 shows the valve characteristics of the flow rate-controlling valve mechanism when a laminated piezoelectric element is used as an actuator, and FIG. 3 shows part of the valve characteristics. Incidentally, the same reference numerals and symbols are assigned to the same constituents as those shown in FIGS. 11 and 12 to omit their explanation.

The mass flow rate-controlling apparatus 40 is provided in the course of a fluid path (for instance, a gas pipe) 4 for flowing a fluid (liquid or gas), to control the mass flow rate of the fluid, which may be called simply "flow rate." Incidentally, a semiconductor-producing apparatus connected to one end of the gas pipe 4 is evacuated. The mass flow rate-controlling apparatus 40 comprises a flow path 6 made of, for instance, stainless steel, etc., which has a fluid inlet 6A connected to the upstream side of the gas pipe 6, and a fluid outlet 6B connected to the downstream side of the gas pipe 6. The mass flow rate-controlling apparatus 40 comprises a means 8 for detecting the mass flow rate of the fluid, a valve mechanism 10 for controlling the flow rate of the fluid, a pressure-detecting means 42, and a means 44 (for instance, microcomputer) for controlling the entire operation of the apparatus.

The controlling means 44 receives a flow rate-setting signal S0 indicating the flow rate of a gas to be supplied to the mass flow rate-controlling apparatus from a host computer 46 for controlling the operation of the entire semiconductor-producing apparatus, and supplies an external flow rate output signal Sout indicating the flow rate of a presently flowing gas. In the depicted example, the gas pressure-detecting means 42, the mass flow rate-detecting means 8 for detecting a gas flow rate, and the flow rate-controlling valve mechanism 10 are arranged in this order from the upstream side of the flow path 6. The pressure-detecting means 42 comprises, for instance, a pressure transducer for sampling and detecting gas pressure at a predetermined time interval (for instance, 10 msec), and outputting the detected pressure as a detected pressure signal Sv to a controlling means 44.

The mass flow rate-detecting means 8 comprises pluralities of bypass pipes 12 disposed on the upstream side of a gas flow in the flow path 6. Disposed on both ends of the bypass pipes 12 is a bypassing sensor pipe 14, through which a smaller amount of a gas is caused to flow at a constant rate than through the bypass pipes 12. Namely, a gas always flows through the sensor pipe 14 at a predetermined ratio of the entire flow rate. A pair of series-connected, controlling resistor lines R1, R4 are wound around the sensor pipe 14, and a sensor circuit 16 connected to the controlling resistor lines R1, R4 outputs a mass flow rate signal S1.

The controlling means 44 (for instance, microcomputer) receives the flow rate signal S1, based on which the mass flow rate of a presently flowing gas is determined, and the flow rate-controlling valve mechanism 10 is controlled such that the mass flow rate is equal to that of the flow rate-setting signal S0 input from outside. In this case, as described later, if necessary, a pressure value indicated by the detected pressure signal Sv is added to flow rate control. The flow rate-controlling valve mechanism 10 comprises a flow rate-controlling valve 20 disposed on the downstream side of the flow path 6, and the flow rate-controlling valve 20 comprises, for instance, a flexible metal plate diaphragm 22 as a valve member for directly controlling the mass flow rate of a gas.

The diaphragm 22 can be properly bent toward a valve opening 24 to arbitrarily control a valve-opening degree of the valve opening 24. To adjust the valve-opening degree, an upper surface of the diaphragm 22 is firmly connected to a lower end of an actuator 26 of the laminated piezoelectric element, for instance. Specifically, the actuator 26 is provided on its lower end with, for instance, a pressing metal block 48, and the diaphragm 22 is provided on its upper surface with, for instance, a metal base block 50. The pressing block 48 and the base block 50 are rigidly connected, for instance, via a hard ball 52 received in their shallow recesses, thereby enabling the mechanical expansion and shrinkage of the actuator 26 to be directly transmitted to the diaphragm 22. Thus, the valve-opening degree of the diaphragm 22 does not change even if the pressure of the gas varies. Further, the hard ball 52 acts to avoid an uneven vertical force.

Figure 12:
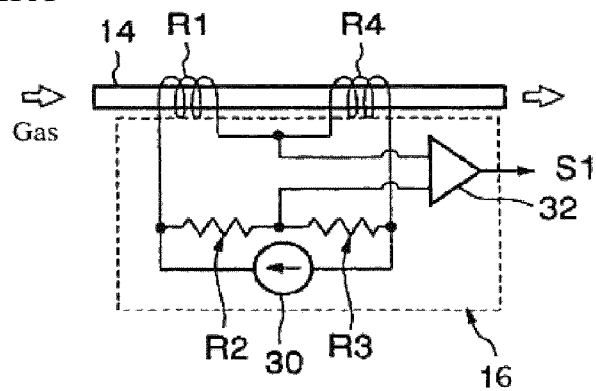
FIG. 12 is a schematic view showing a circuit of a flow rate-detecting means in the mass flow rate-controlling apparatus.

The laminated piezoelectric element, which has, for instance, a structure having large numbers of PZT plates laminated via electrodes, mechanically expands and shrinks in a longitudinal direction by voltage applied. The actuator 26 is completely surrounded by a casing 27. With the valve-operating circuit 28 receiving an operating signal S3 from the controlling means 44, the actuator 26 is operated by a valve-operating signal S4 (voltage) supplied from the valve-operating circuit 28. The actuator 26 may be an electromagnetic actuator in place of the laminated piezoelectric element, but in the case of the electromagnetic actuator, valve-operating current is output as the valve-operating signal. The relation of the resistor lines R1, R4 to the sensor circuit 16 is the same as shown in FIG. 12, so its explanation is omitted.

The controlling means 44 comprises a memory 44A, which may comprise RAM and ROM in combination to store various data (information) necessary for an arithmetic treatment. The memory 44A stores the valve characteristics of the flow rate-controlling valve mechanism 10 measured in advance. The valve characteristics are such that as the valve-operating signal (voltage) S4 corresponding to the valve-opening degree increases, the flow rate increases along a curved line as shown in FIG. 2(a), and that when gas pressure on the inlet side changes from 0.18 MPa to 0.4 MPa, the flow rate increases because higher gas pressure results in a higher gas density. FIG. 2(b) shows the same valve characteristic as in FIG. 2(a) with an inlet-side gas pressure on the axis of abscissas. As is clear from this valve characteristic, when the valve-operating signal (voltage) S4 is constant, the inlet-side gas pressure is proportional to the flow rate. According to this valve characteristic, when the input-side gas pressure is, for instance, 0.4 MPa, the gas flow rate changes with the valve-operating voltage Vd as shown in FIG. 3.

The operation of the mass flow rate-controlling apparatus of the present invention will be explained in detail below. The feature of the present invention is that based on a pressure variation obtained from the detected pressure signal Sv, the controlling means 44 selectively switches a first control mode for controlling a mass flow rate based on a flow rate signal S1 and a flow rate-setting signal S0 without using the detected pressure signal Sv, and a second control mode for controlling a mass flow rate based on the detected pressure signal Sv, the flow rate signal S1 and the flow rate-setting signal S0.

A gas flowing through the gas pipe 4 flows into the flow path 6 in the mass flow rate-controlling apparatus 40 from the fluid inlet 6A, and enters into the mass flow rate-detecting means 8 after a gas pressure is detected by the pressure-detecting means 42. Though most of the gas flows through the bypass pipes 12, a gas at a constant ratio to the total flow rate flows through the sensor pipe 14. These gas flows converge on the downstream side to pass through a valve opening 24 of the flow rate-controlling valve 20 in the flow rate-controlling valve mechanism 10, and enter into a semiconductor-producing apparatus (not shown) via the fluid outlet 6B. The atmosphere in a chamber of the semiconductor-producing apparatus may be vacuum, reduced pressure or normal pressure.

Because the resistor lines R1, R4 are wound around the sensor pipe 14, the sensor circuit 16 can detect a gas flowing through the sensor pipe 14, thereby determining the overall flow rate of the gas flowing through the gas pipe. The value detected by the sensor circuit 16 is sent as the flow rate signal S1 to the controlling means 44. In order that a mass flow rate represented by the flow rate signal S1 becomes identical to that represented by the flow rate-setting signal S0 input from outside, the controlling means 44 generates a valve-operating voltage S4 via the valve-operating circuit 28, and this voltage S4 is applied to the actuator 26 to bend the diaphragm 22 of the actuator 26 to control the valve-opening degree of the flow rate-controlling valve 20. Thus, the gas can be caused to flow downstream with a controlled mass flow rate.

Pressure variation caused in the gas pipe 4 upstream of the mass flow rate-controlling apparatus 40 for some reasons is conveyed downstream. However, because flow rate control is conducted by selectively switching the first and second control modes depending on gas pressure variation in the present invention, the pressure variation can be effectively absorbed, thereby preventing adverse effect on the mass flow rate-controlling apparatus 40. The first control mode is a control method of making the detected value represented by the flow rate signal S1 always identical to the set value represented by flow rate-setting signal S0 from outside.

Figure 4:
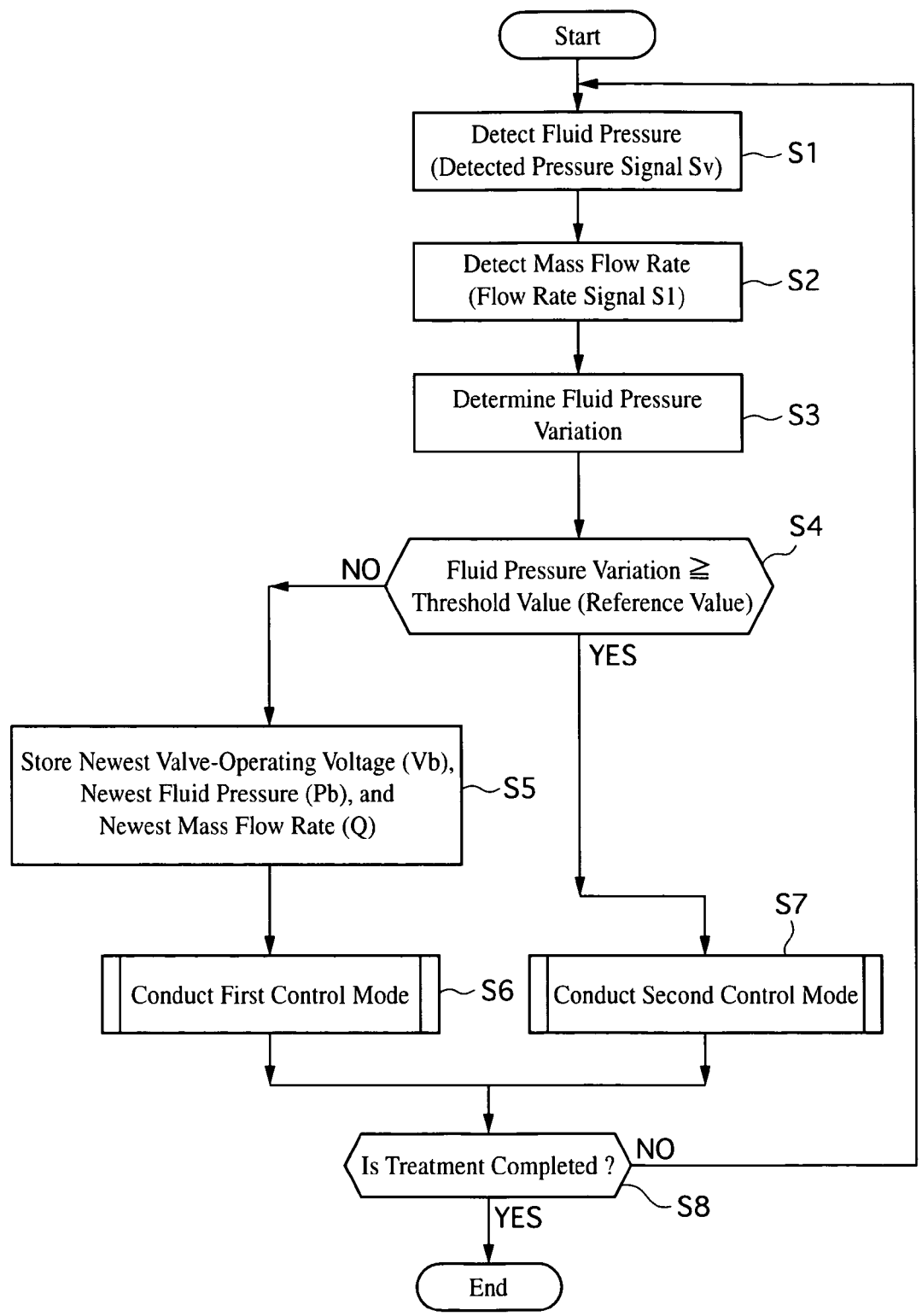
FIG. 4 is a flow chart showing the control of the mass flow rate-controlling apparatus of the present invention.
Figure 5:
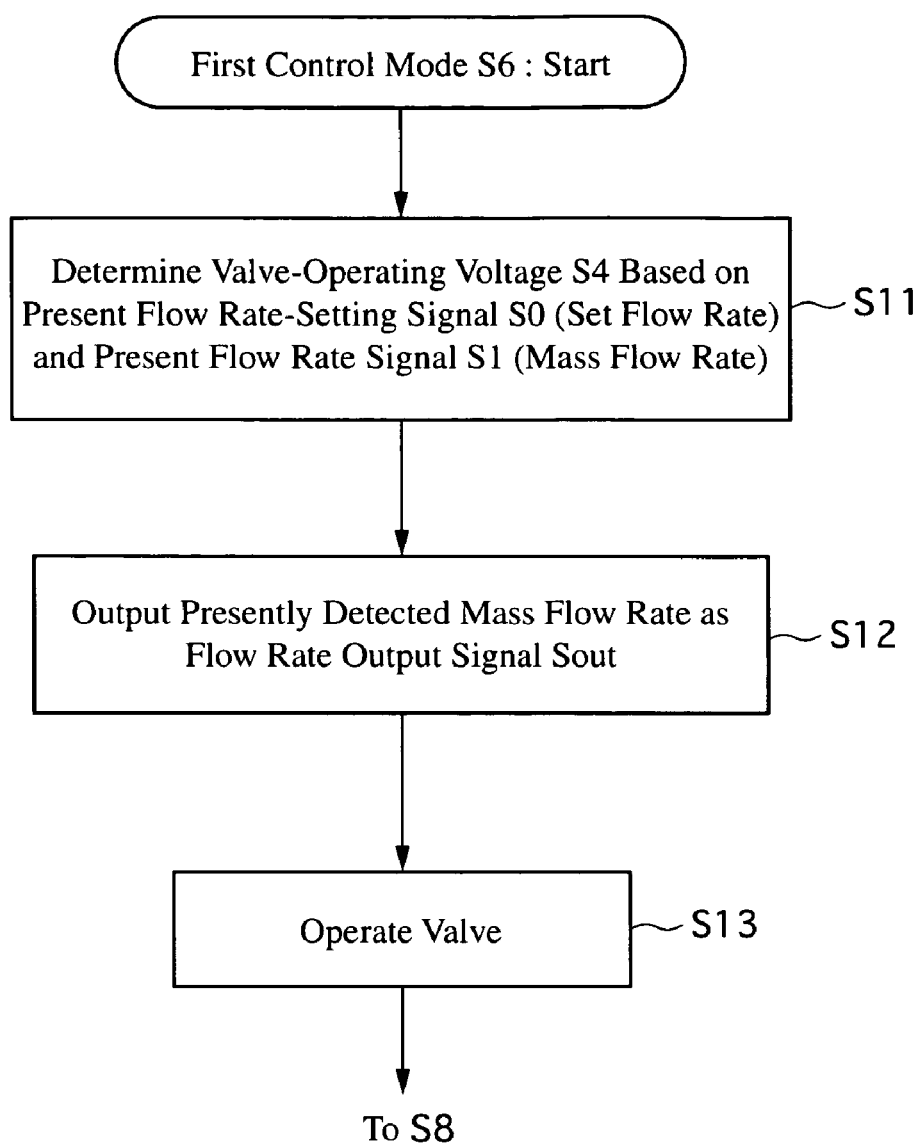
FIG. 5 is a flow chart showing the first control mode.
Figure 6:
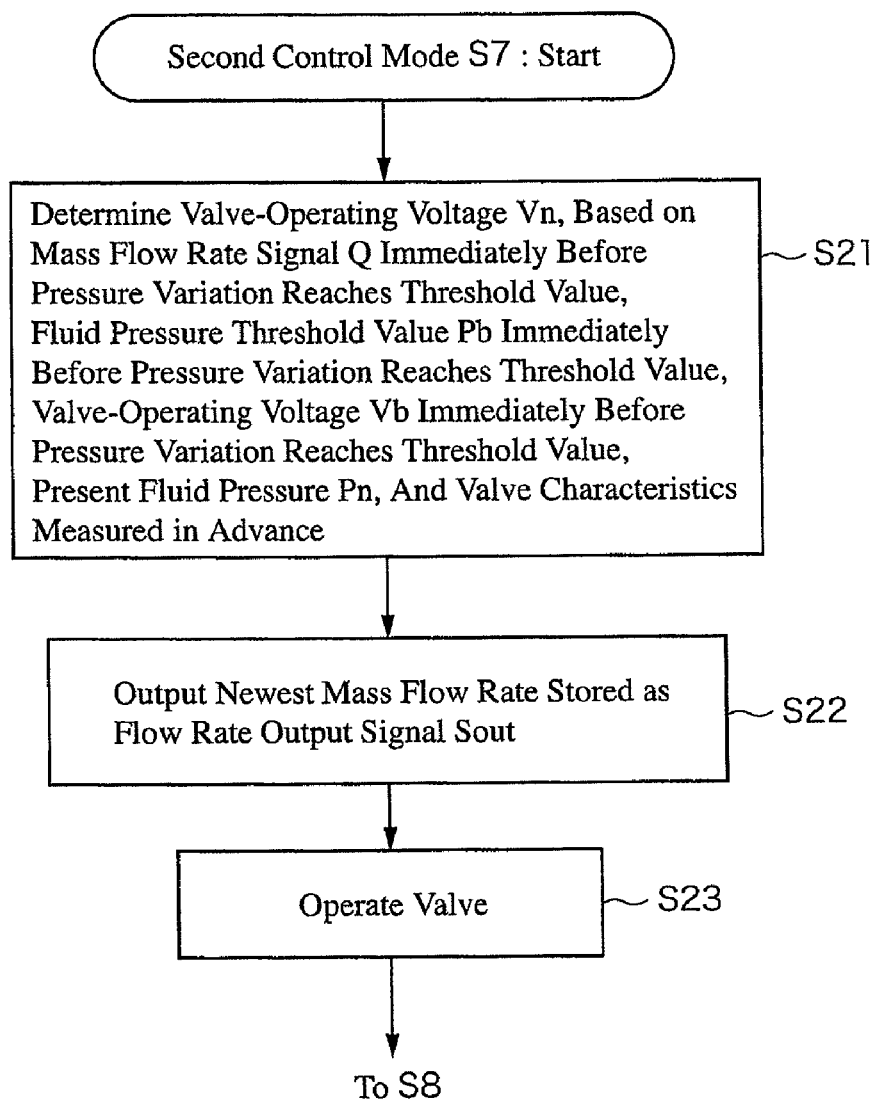
FIG. 6 is a flow chart showing the second control mode.
Figure 7:
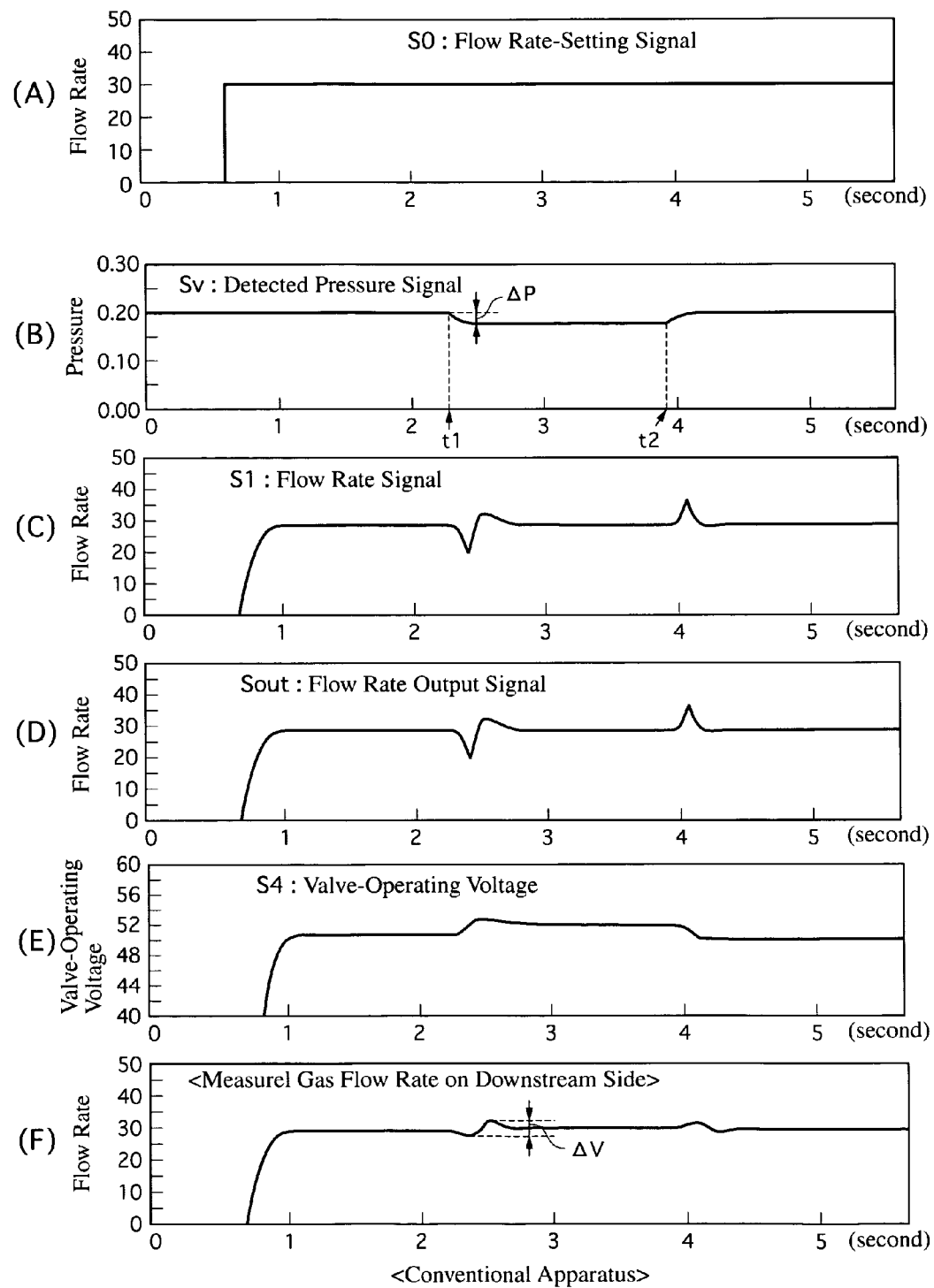
FIG. 7 is a graph showing the variation of each signal when only the first control mode is conducted.
Figure 8:
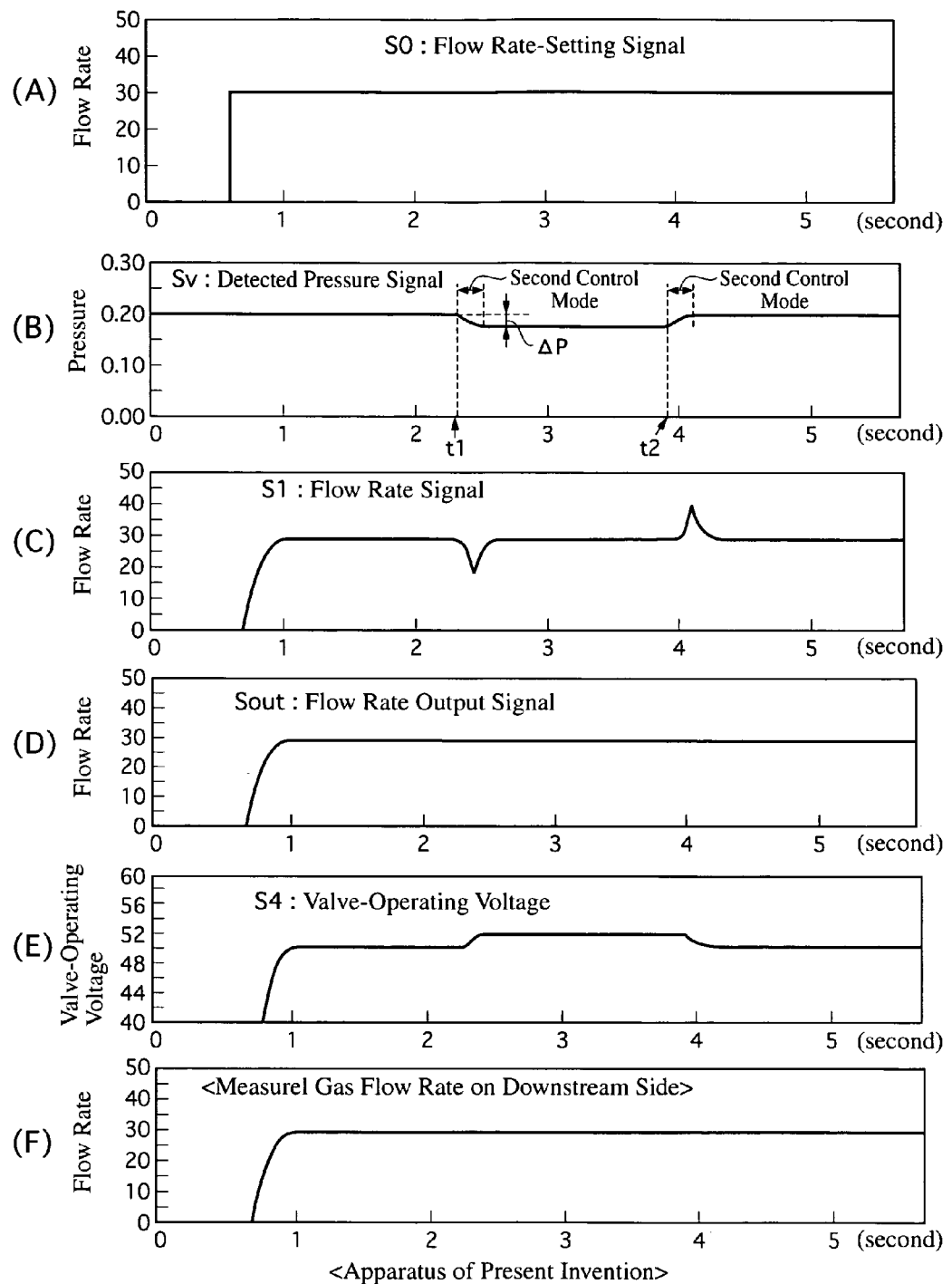
FIG. 8 is a graph showing the variation of each signal when control is conducted by selectively switching the first control mode and the second control mode according to the present invention.

FIG. 4 shows the control flow of the present invention, FIG. 5 shows a control flow in the first control mode, FIG. 6 shows a control flow in the second control mode, FIG. 7 shows the variation of each signal in a conventional control method in which only the first control mode is performed, and FIG. 8 shows the variation of each signal when the first control mode and the second control mode are selectively switched according to the present invention.

The overall operation of the mass flow rate-controlling apparatus of the present invention will be explained referring to FIG. 4. Gas pressure is detected by the pressure-detecting means 42, and this detected value is output as the detected pressure Sv (step S1). The mass flow rate of the fluid is also detected by the mass flow rate-detecting means 8, and this detected value is output as the flow rate signal S1 (step S2). Sampling measurement of the fluid pressure and the mass flow rate is continuously conducted at a predetermined interval (for instance, 10 msec).

The detected value of the fluid pressure is always compared with the penultimate detected value (for instance, value detected before 10 msec), which is stored, to determine pressure variation (step S3), and the pressure variation is compared with a predetermined threshold value, a reference value (step S4). The threshold value is, for instance, about 100 Pa, though changeable depending on a fluid-supplying pressure. When the pressure variation is smaller than the threshold value (100 Pa) (No in step S4), the newest valve-operating voltage (step S4), the newest detected pressure (Sv) and the newest mass flow rate S1 are stored in their own areas in the memory 44A (step S5). The term "newest" means a value presently detected, not a value detected immediately earlier (before 100 msec). Because the first control mode is conducted in this state (step S6), the first control mode is a control mode when there is an extremely small pressure variation in the upstream fluid.

When the step S4 is Yes, namely when the pressure variation is equal to or more than the threshold value, the second control mode is conducted (step S7). The second control mode is a control mode when there is a relatively large pressure variation in the upstream fluid. After the first or second control mode is conducted, the operation returns to the step S1 if the treatment has not been completed, and it is terminated if the treatment has been completed (step S8).

As shown in FIG. 5, in the first control mode identical to the conventional control method, the mass flow rate of the present flow rate signal S1 from the mass flow rate-detecting means 8 is compared with the set flow rate of the present flow rate-setting signal S0 input from outside, to determine a valve-operating voltage S4, at which they are made equal (step S11). This control makes the actual fluid flow rate equal to the fluid flow rate instructed by the flow rate-setting signal S0 from the host computer 46.

At the same time as the above operation, the controlling means 44 outputs a presently detected mass flow rate as a flow rate output signal Sout to the host computer 46 (step S12). Specifically, a mass flow rate value represented by the flow rate output signal Sout becomes equal to a mass flow rate represented by the flow rate signal S1. To confirm whether or not the gas is supplied at an appropriate flow rate, the flow rate output signal Sout is monitored by an operator, for instance, at the host computer 46. The controlling means 44 supplies an operating signal S3 to the valve-operating circuit 28, from which a valve-operating voltage S4 is output to operate the valve of the actuator 26 (step S13). After the valve operation is completed, the operation proceeds to a step S8 shown in FIG. 4.

The second control mode is a control mode when the gas pressure variation is equal to or more than the threshold value, which determines the valve-operating voltage, as shown in FIG. 6, based on the mass flow rate, the detected pressure and the valve-opening voltage immediately before the pressure variation reaches the threshold value, the presently detected pressure, and the predetermined valve characteristics (step S21). The mass flow rate, the detected pressure and the valve-operating voltage immediately before the pressure variation reaches the threshold value, are values stored in the step S5 in FIG. 4, for instance, before 10 msec. The valve characteristics are stored in advance as shown in FIG. 3.

Not the presently detected pressure but the mass flow rate stored, for instance, before 10 msec is output as the flow rate output signal Sout to the host computer 46 (step S22). This enables an operator of the host computer 46 to recognize that there is no variation in the mass flow rate. The valve of the actuator 26 is operated by the valve-operating voltage S4 output from the valve-operating circuit 28 by instruction of the operating signal S3 (step S23). This enables high precision control of the mass flow rate by absorbing pressure variation occurring in the input-side gas flow.

After the valve operation is completed, the operation proceeds to the step 8 shown in FIG. 4. As is clear from the overall flow, once a large pressure variation is generated in a usual gas flow, it lasts for several sampling periods to several tens of sampling periods. During such period of time, the mass flow rate stored in the host computer 46 immediately before the pressure variation occurs continues to be output as the flow rate output signal Sout.

The calculation of the valve-operating voltage in the step S21, which is the feature of the present invention, is conducted as follows: A target valve-operating voltage Vn (=S4) to be applied is determined by the following formula (1);

$$Vn = Vb + (1 - Pb/Pn)/k, \quad (1),$$

$$k = (Q/Vmb) \cdot (Pb/Pm),$$

Pb: Pressure detected before pressure variation becomes equal to or more than the threshold value (the newest fluid pressure value stored), Pn: Presently detected pressure, Vb: Valve-operating voltage before pressure variation becomes equal to or more than the threshold value (newest valve-operating voltage stored), k: Flow rate variation ratio per a unit volt at the valve-operating voltage before pressure variation becomes equal to or more than the threshold value, Q: Mass flow rate before pressure variation becomes equal to or more than the threshold value (newest mass flow rate stored), Vmb: Master voltage before pressure variation becomes equal to or more than the threshold value, and Pm: Gas pressure, at which a master valve characteristic was obtained.

The "master" means a valve characteristic stored in advance as shown in FIG. 3, for instance, a valve characteristic when the gas pressure is 0.4 MPa. Specifically, assuming that there is a pressure variation equal to or more than the threshold value in the gas flow at a constant flow rate-setting signal S0, during a stable operation in which the mass flow rate and the gas pressure are 60 cc/minute (=Q) and 0.2 MPa (=Pb), respectively. Incidentally, Pm is 0.4 MPa. At a valve-operating voltage before pressure variation becomes equal to or more than the threshold value at that time, the flow rate variation ratio k per a unit volt is determined by the following formula:

$$k = (Q/Vmb) \cdot (Pb/Pm) = (60/Vmb) \cdot (0.2/0.4) = 30/Vmb,$$

and the valve characteristics shown in FIG. 3.

Because it is shown by FIG. 3 that the valve-operating voltage Vmb at 30 cc/minute is 35 volt, the flow rate variation ratio k is determined at 35 volt. The flow rate variation ratio k is constant regardless of the gas pressure variation, when the valve-operating voltage is constant. Specifically, the flow rate variation ratio k is 0.857 (=30/35) %. By introducing this flow rate variation ratio k into the formula (1), the valve-operating voltage Vn to be applied to the actuator can be determined. In the second control mode, the valve-operating voltage Vn (=S4) is applied to the actuator.

Though the valve-operating voltage Vn (=S4) is determined as the valve-operating signal here, what is needed in the case of an electromagnetic actuator is to determine a valve-operating current based on the same formula and valve characteristics (on a current basis) as above as the valve-operating signal.

FIG. 7 shows the wave form and flow rate of each signal in a conventional control method (only the first control mode), and FIG. 8 shows the wave form and flow rate of each value in the control method of the present invention. FIGS. 7(A) and 8(A) show the flow rate-setting signal S0, FIGS. 7(B) and 8(B) show the detected pressure signal Sv, FIGS. 7(C) and 8(C) show the flow rate signals S1, FIGS. 7(D) and 8(D) show the flow rate output signals Sout, FIGS. 7(E) and 8(E) show the valve-operating signals S4, and FIGS. 7(F) and 8(F) show the measured values of the gas flow rates on the downstream side. In FIGS. 7 and 8, the unit of the flow rate is cc/minute, the unit of pressure is kPa, and the unit of the valve-operating voltage is volt. Because the conventional mass flow rate-controlling apparatus does not have a pressure sensor, the wave form shown in FIG. 7(B) was obtained with a pressure sensor installed. Also, another mass flow rate meter was installed in the mass flow rate-controlling apparatus on the fluid outlet side to measure a mass flow rate, thereby obtaining the wave form shown in FIG. 7(F). This is true also in FIG. 8(F).

As shown in FIG. 7, in a state where the flow rate-setting signal S0 shown in FIG. 7(A) is constant, the pressure decreases by ΔP (≧threshold value) at time t1 as shown in FIG. 7(B) for some reasons, and returns to the original pressure at time t2. The gas flow rate largely varies at time t1 and t2 as shown in FIG. 7(C) due to this pressure variation.

To absorb flow rate variation depending on the variation of the flow rate signal S1, the valve-operating signal S4 was changed as shown in FIG. 7(E), resulting in overshoot, etc. As a result, the gas flow rate suffered amplitude pulsation ΔV at time t1, t2 as shown in FIG. 7(F), resulting in low controllability of the gas flow rate. In this case, because the flow rate signal S1 shown in FIG. 7(C) is output as the flow rate output signal Sout to the host computer 46 (see FIG. 1) without change [see FIG. 7(D)], a monitoring operator can know how the controllability of the gas flow rate is deteriorated at time t1, t2.

In the case of the present invention shown in FIG. 8, as shown in FIG. 8(B), even though there is pressure variation equal to or more than the threshold value in the gas flow at the same time t1, t2, the second control mode is switched on while variation equal to or more than the threshold value continues. Thus, though there is large variation in the flow rate signal S1 at time t1, t2 as shown in FIG. 8(C), the first control mode is switched to the second control mode, and the valve-operating voltage S4 having a wave form shown in FIG. 8(E) determined by the above calculation is applied to the actuator. As a result, the valve-opening degree of the flow rate-controlling valve 20 (see FIG. 1) is appropriately controlled, so that despite pressure variation in the upstream gas flow at time t1, t2, the flow rate of the gas exiting from the fluid outlet is kept constant as shown in FIG. 8(F).

Thus, by absorbing the pressure variation of the upstream gas, the controllability of the mass flow rate can be kept high. Unlike the conventional technologies outputting the flow rate signal S1 as the flow rate output signal Sout without modification, the flow rate signal S1 immediately before pressure variation equal to or more than the threshold value occurs is output as the flow rate output signal Sout in the present invention (step S22). Accordingly, an operator monitoring at the host computer 46 can confirm that the gas actually flowing into the semiconductor-producing apparatus has a normal flow rate [FIG. 8(F)].

Figure 9:
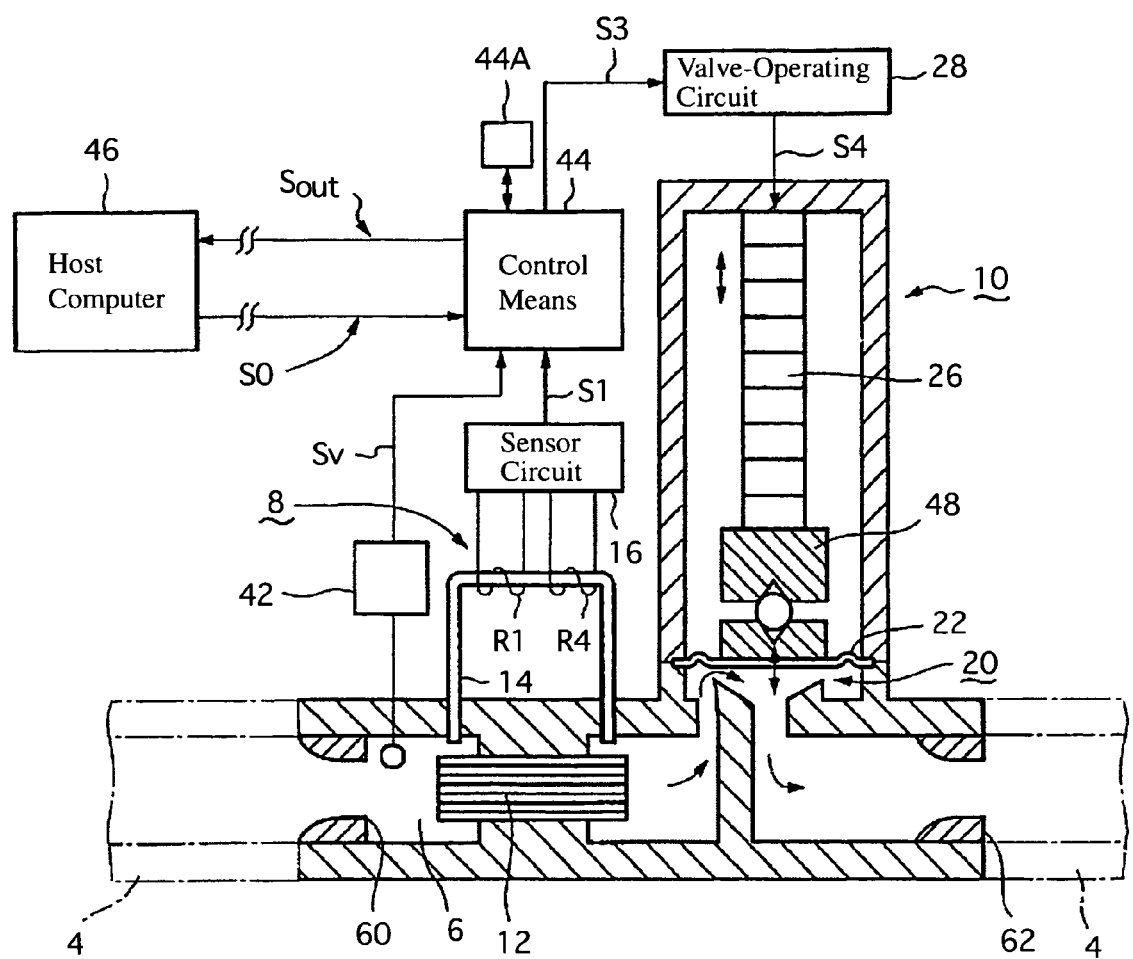
FIG. 9 is a schematic view showing another example of the mass flow rate-controlling apparatus of the present invention.

FIG. 9 shows another embodiment of the present invention. This mass flow rate-controlling apparatus comprises orifices 60, 62 in the fluid inlet and outlet 6A, 6B shown in FIG. 1. One or both orifices 60, 62 may be provided. The orifices 60, 62 can attenuate the gas pressure variation from the upstream and downstream sides, thereby suppressing rapid pressure variation. Accordingly, the controllability of the gas flow rate can be further improved.

Figure 10:
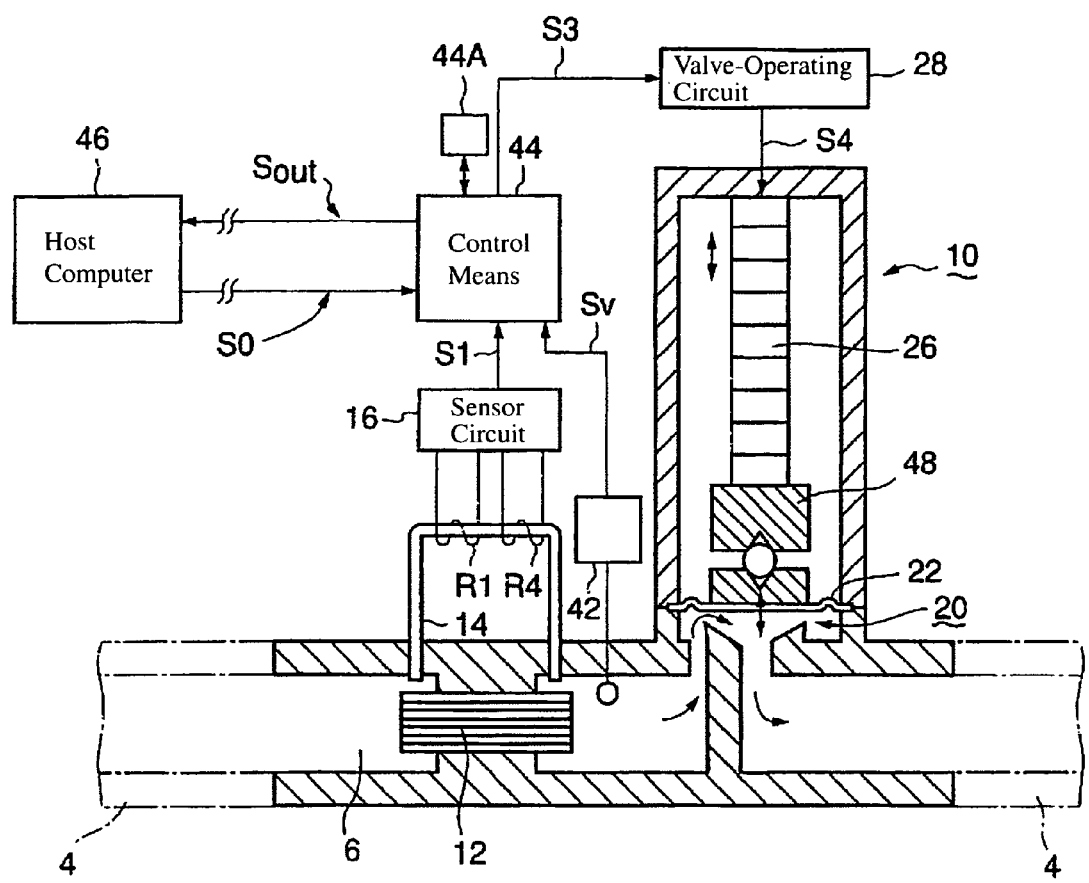
FIG. 10 is a schematic view showing a further example of the mass flow rate-controlling apparatus of the present invention.

FIG. 10 shows a further embodiment of the present invention. The apparatus in FIG. 1 comprises a pressure-detecting means 42, a mass flow rate-detecting means 8, and a flow rate-controlling valve mechanism 10 in this order from the upstream side of the flow path 6, though it may be changed to the order of the mass flow rate-detecting means 8, the pressure-detecting means 42 and the flow rate-controlling valve mechanism 10 as shown in FIG. 10. In this case, because gas pressure is detected by the pressure-detecting means 42 immediately upstream of the flow rate-controlling valve mechanism 10, resulting in further improved controllability of the flow rate of a fluid.

EFFECT OF THE INVENTION

In the mass flow rate-controlling apparatus of the present invention, the mass flow rate-controlling modes can be selectively switched depending on the pressure variation of a fluid in a flow path, thereby absorbing pressure variation effectively with high controllability in the mass flow rate.

What is claimed is:

1. A mass flow rate controlling apparatus comprising a mass flow rate-detecting means attached to a fluid flow path, through which a fluid is supplied, for detecting a mass flow rate at predetermined time intervals, a flow rate-controlling valve mechanism attached to said fluid flow path for changing a valve-opening degree in response to a valve operating signal to control said mass flow rate, a controlling means for supplying said valve-operating voltage to said flow rate controlling valve mechanism, and a pressure-detecting means attached to said fluid flow path for detecting the pressure of said fluid at predetermined time intervals;

wherein a pressure variation is obtained from the detected pressure;

wherein said controlling means uses a first control mode for controlling said mass flow rate when said pressure variation is less than a predetermined threshold value;

wherein in said first control mode, said controlling means stores a newest detected mass flow rate, a newest detected pressure and a newest valve-operating voltage for a current time interval;

wherein in said first control mode, said controlling means compares a present mass flow rate signal obtained from said mass flow rate-detecting means with an externally input flow rate-setting signal to determine said valve-operating voltage;

wherein said controlling means switches said first control mode to a second control mode when said pressure variation becomes equal to or more than said predetermined threshold value; and wherein in said second control mode, said controlling means determines said valve-operating voltage from the newest mass flow rate, the newest detected pressure and the newest valve operating voltage stored in said first control mode, a currently detected pressure, and valve characteristics stored in advance.

2. The mass flow rate-controlling apparatus according to claim 1, wherein said valve-operating voltage Vn in said second control mode is determined by the following formula (1);

$$Vn = Vb + (1 - Pb/Pn)/k \qquad (1),$$

wherein Vb is the newest valve-operating voltage, Pb is the newest detected pressure, Pn is the currently detected pressure, and k is a flow rate variation ratio per a unit volt at the valve-operating voltage before the pressure variation becomes equal to or more than the predetermined threshold value.

3. The mass flow rate-controlling apparatus according to claim 1, wherein said controlling means outputs a mass flow rate before said pressure variation reaches said predetermined threshold value as a flow rate output signal in said second control mode.

4. The mass flow rate-controlling apparatus according to claim 1, wherein said fluid path is provided with said pressure-detecting means, said mass flow rate-detecting means and said flow rate-controlling valve mechanism in this order from the upstream side.

5. The mass flow rate-controlling apparatus according to claim 1, wherein said fluid path is provided with said mass flow rate-detecting means, said pressure-detecting means and said flow rate-controlling valve mechanism in this order from the upstream side.

6. The mass flow rate-controlling apparatus according to claim 1, wherein said flow rate-controlling valve mechanism comprises an actuator comprising a piezoelectric element.

7. The mass flow rate-controlling apparatus according to claim 1, wherein said flow rate-controlling valve mechanism comprises an electromagnetic actuator.

8. The mass flow rate-controlling apparatus according to claim 1, wherein said fluid path comprises an orifice in the most upstream portion.

9. The mass flow rate-controlling apparatus according to claim 1, wherein said fluid path comprises an orifice in the most downstream portion.

10. The mass flow rate-controlling apparatus according to claim 1, wherein said controlling means comprises RAM and ROM in combination.

* * * * *